(12) United States Patent
Inoue

(10) Patent No.: US 12,140,969 B2
(45) Date of Patent: Nov. 12, 2024

(54) WATERCRAFT RUNNING SYSTEM, AND WATERCRAFT INCLUDING THE SAME

(71) Applicant: YAMAHA HATSUDOKI KABUSHIKI KAISHA, Iwata (JP)

(72) Inventor: Hiroshi Inoue, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 204 days.

(21) Appl. No.: 17/983,442

(22) Filed: Nov. 9, 2022

(65) Prior Publication Data
US 2023/0161360 A1 May 25, 2023

(30) Foreign Application Priority Data

Nov. 22, 2021 (JP) ................................ 2021-189548

(51) Int. Cl.
*B63B 79/40* (2020.01)
*B63B 79/30* (2020.01)
(Continued)

(52) U.S. Cl.
CPC .............. *G05D 1/048* (2013.01); *B63B 79/30* (2020.01); *B63B 79/40* (2020.01); *B63H 25/04* (2013.01);
(Continued)

(58) Field of Classification Search
CPC ........ G05D 1/048; B63B 79/40; B63B 79/30; B63H 25/04; B63H 25/44; B63H 2025/022
(Continued)

(56) References Cited

U.S. PATENT DOCUMENTS 8,113,892 B1 * 2/2012 Gable .................... B63H 21/21
114/144 RE
9,278,740 B1 * 3/2016 Andrasko ............ G05D 1/0875
(Continued)

FOREIGN PATENT DOCUMENTS

JP          2007191138 A  *  8/2007  ........... B63B 39/061

OTHER PUBLICATIONS

Jokar et al., Planing craft control using pneumatically driven trim tab, 2020, ScienceDirect: Mathematics and Computers in Simulation, 178, 439-463 (Year: 2020).*

*Primary Examiner* — Elaine Gort
*Assistant Examiner* — Preston Jay Miller
(74) *Attorney, Agent, or Firm* — Keating & Bennett, LLP

(57) ABSTRACT

A watercraft running system includes a propulsion device, a steering device, a course changing operator, a port-side attitude control plate and a starboard-side attitude control plate, a port-side actuator and a starboard-side actuator, and a controller. The controller is operable in a first control mode in which the steering device is controlled according to the operation of the course changing operator and a second control mode in which the port-side actuator and the starboard-side actuator are controlled according to the operation of the course changing operator. The controller is configured or programmed to prohibit shifting from the first control mode to the second control mode if the steering position of the steering device is not a neutral position, and to permit the shift from the first control mode to the second control mode if the steering position is the neutral position.

12 Claims, 8 Drawing Sheets

(51) Int. Cl.
  *B63H 25/04* (2006.01)
  *B63H 25/44* (2006.01)
  *G05D 1/00* (2024.01)
  *B63H 25/02* (2006.01)

(52) U.S. Cl.
  CPC ....... *B63H 25/44* (2013.01); *B63H 2025/022* (2013.01)

(58) Field of Classification Search
  USPC .......................................................... 701/21
  See application file for complete search history.

(56) References Cited

U.S. PATENT DOCUMENTS

| | | | |
|---|---|---|---|
| 10,112,692 B1* | 10/2018 | Anschuetz | G05D 3/00 |
| 11,372,411 B1* | 6/2022 | Derginer | G05D 1/0206 |
| 2017/0210453 A1* | 7/2017 | Morvillo | B63H 21/21 |
| 2021/0107617 A1* | 4/2021 | Nakatani | B63H 25/44 |
| 2022/0009611 A1* | 1/2022 | Malouf | B63H 20/12 |

* cited by examiner

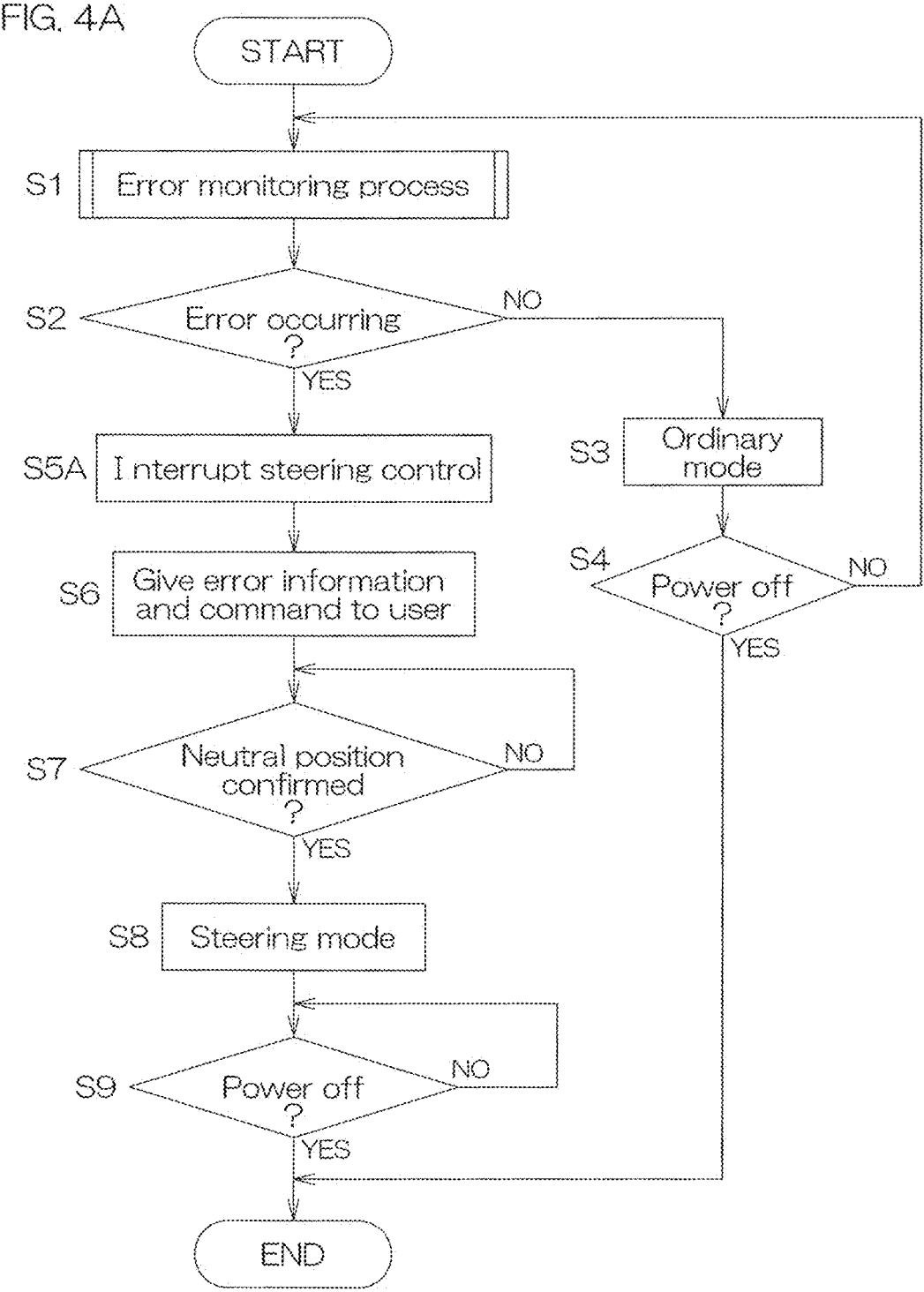

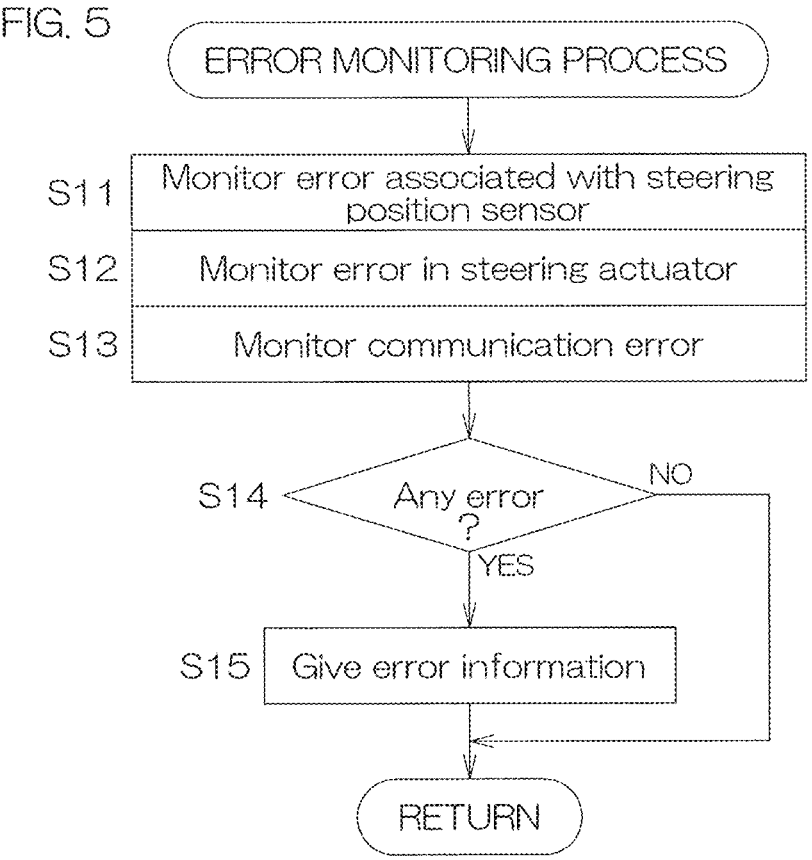

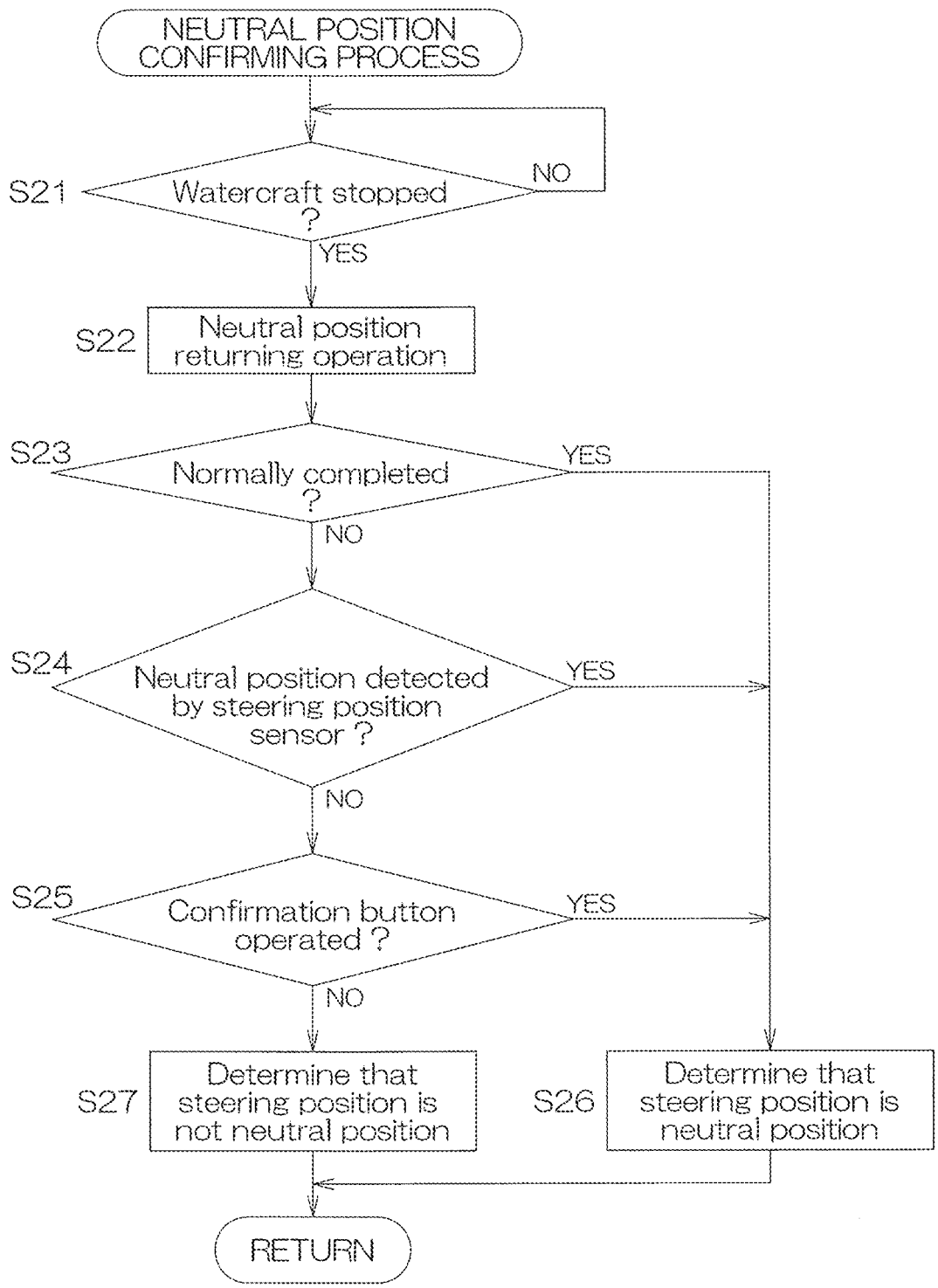

WATERCRAFT RUNNING SYSTEM, AND WATERCRAFT INCLUDING THE SAME

CROSS REFERENCE TO RELATED APPLICATIONS

This application claims the benefit of priority to Japanese Patent Application No. 2021-189548 filed on Nov. 22, 2021. The entire contents of this application are hereby incorporated herein by reference.

BACKGROUND OF THE INVENTION

1. Field of the Invention

The present invention relates to a watercraft running system, and a watercraft including the same.

2. Description of the Related Art

US 2021/0107617 A1 discloses a steering control process which has a first mode and a second mode as hull steering modes. The first mode is an ordinary steering mode in which the steering of an outboard motor is controlled according to a course command applied by operating a steering wheel. The second mode is an emergency steering mode in which a trim tab actuator is controlled according to the course command applied by operating the steering wheel. When the steering system of the outboard motor works abnormally, the second mode is selected. Thus, left and right trim tabs are driven in accordance with the operation of the steering wheel. Where a propeller is able to be rotated by the rotation of an engine, the course of the hull is able to be changed by utilizing a difference in running resistance between the left and right trim tabs.

SUMMARY OF THE INVENTION

The inventor of preferred embodiments of the present invention described and claimed in the present application conducted an extensive study and research regarding a watercraft running system, such as the one described above, and in doing so, discovered and first recognized new unique challenges and previously unrecognized possibilities for improvements as described in greater detail below.

A steering operation utilizing attitude control plates (trim tabs or the like) provided on the port side and the starboard side of a hull is influenced by the direction of a propulsive force generated by a propulsion device. If the proper setting of the direction of the propulsive force is able to be confirmed, therefore, it is possible to ensure an excellent steerability while utilizing the attitude control plates.

Preferred embodiments of the present invention provide watercraft running systems and watercraft which each provide excellent steerability when a course is changed by utilizing left and right attitude control plates.

In order to overcome the previously unrecognized and unsolved challenges described above, a preferred embodiment of the present invention provides a watercraft running system which includes a propulsion device to apply a propulsive force to the hull of a watercraft, a steering device to change the course of the watercraft, a course changing operator operable by a user to change the course of the watercraft, a port-side attitude control plate and a starboard-side attitude control plate provided on the port side and the starboard side, respectively, of the hull to control the attitude of the hull and operable to move up and down on the port side and the starboard side, respectively, of the hull, a port-side actuator and a starboard-side actuator to actuate the port-side attitude control plate and the starboard-side attitude control plate, respectively, and a controller. The controller is configured or programmed to include a first control mode in which the steering device is controlled according to the operation of the course changing operator and a second control mode in which the port-side actuator and the starboard-side actuator are controlled according to the operation of the course changing operator. The controller is configured or programmed to determine whether or not the steering position of the steering device is a neutral position, to prohibit shifting from the first control mode to the second control mode if the steering position is not the neutral position, and to permit the shift from the first control mode to the second control mode if the steering position is the neutral position.

With this arrangement, when the control mode of the controller is the first control mode, the course of the watercraft is changed by the steering device according to the operation of the course changing operator. With the propulsive force applied to the hull by the propulsion device, therefore, the watercraft travels along the course according to the steering position of the steering device. Since the steering position of the steering device is responsive to the operation of the course changing operator, the watercraft travels along the course according to the operation of the course changing operator. When the control mode of the controller is the second control mode, the port-side attitude control plate and the starboard-side attitude control plate are moved up and down according to the operation of the course changing operator to change the running resistance distribution between the port side and the starboard side of the hull. When the propulsive force is applied to the hull by the propulsion device, therefore, the watercraft travels along the course according to the running resistance distribution between the port side and the starboard side. Since the positions of the port-side attitude control plate and the starboard-side attitude control plate are responsive to the operation of the course changing operator, the watercraft travels along the course according to the operation of the course changing operator. Therefore, the user is able to steer the watercraft by operating the course changing operator in either of the first control mode and the second control mode.

For the shift from the first control mode to the second control mode, it is necessary to determine that the steering position of the steering device is the neutral position. Thus, the control operation is to be started in the second control mode with the steering position of the steering device set in the neutral position. In the second control mode, therefore, the steering device is substantially irrelevant to the course change so that a steering operation is to be properly and efficiently performed by the actuation of the port-side attitude control plate and the starboard-side attitude control plate. This provides excellent steerability.

The shift from the first control mode to the second control mode may be automatically performed by the controller, or may be performed according to a mode shift operation performed by the user.

In a preferred embodiment of the present invention, the controller is configured or programmed to perform an error monitoring operation to monitor whether or not an error occurs in a steering operation performed by actuating the steering device in response to the operation of the course changing operator in the first control mode, and, if the error is detected, to effect the shift to the second control mode on condition that the steering position is the neutral position.

With this arrangement, the error monitoring operation is performed to monitor whether or not the error occurs in an operation sequence performed by the actuation of the steering device in response to the operation of the course changing operator when the control mode of the controller is the first control mode. Specifically, inconsistency between the operation of the course changing operator and the actuation of the steering device is detected as the error. More specifically, where a steering position sensor is provided to detect the actuation of the steering device, an error is detected for inconsistency between a steering position detected by the steering position sensor and the operation of the course changing operator. This error is likely to occur when some trouble occurs in the steering position sensor or its wiring. Further, the error is likely to be detected when some trouble occurs in an actuator of the steering device. Furthermore, the error is likely to be detected when some trouble occurs in communication lines for signal transmission. When the error is detected, the controller effects the shift to the second control mode on condition that the steering position is the neutral position. If the error occurs in the steering operation performed in the first control mode, therefore, the shift to the second control mode is automatically performed on condition that the steering position is the neutral position. Thus, the steering operation is to be automatically shifted to the steering operation that utilizes the port-side attitude control plate and the starboard-side attitude control plate.

In a preferred embodiment of the present invention, the system further includes a notifier to provide information to the user. The controller is configured or programmed so as to control the notifier to provide the user with a command to set the steering position of the steering device to the neutral position if the error is detected.

With this arrangement, the command is provided to the user if the error occurs in the operation performed by the actuation of the steering device in response to the operation of the course changing operator. Following the command, the user typically manually sets the steering position of the steering device to the neutral position. Even if some trouble occurs in the steering device, the user is properly prompted to set the steering position of the steering device to the neutral position.

In a preferred embodiment of the present invention, the controller is configured or programmed to control the notifier to provide the user with a command to decelerate or stop the watercraft if the error is detected.

With this arrangement, the command to decelerate or stop the watercraft is provided to the user if the error occurs in the operation performed by the actuation of the steering device in response to the operation of the course changing operator. Following the command, the user performs a watercraft maneuvering operation to decelerate or stop the watercraft. Then, the user is able to perform an operation to set the steering position of the steering device to the neutral position with the watercraft decelerated or stopped.

In a preferred embodiment of the present invention, the controller is configured or programmed to control the propulsion device to decelerate or stop the watercraft if the error is detected.

With this arrangement, the watercraft is automatically decelerated or stopped if the error occurs in the operation performed by the actuation of the steering device in response to the operation of the course changing operator. Therefore, the user is able to perform the operation to set the steering position of the steering device to the neutral position with the watercraft decelerated or stopped.

In a preferred embodiment of the present invention, the system further includes a confirmation operator operable by the user after the user sets the steering position of the steering device to the neutral position. The controller is configured or programmed to determine that the steering position is the neutral position if the operation of the confirmation operator is detected.

With this arrangement, the controller determines that the steering position of the steering device is the neutral position if the user operates the confirmation operator (or the user performs the confirmation operation) after setting the steering position of the steering device to the neutral position. Thus, the shift from the first control mode to the second control mode is permitted. Even when it is impossible to confirm with the use of the sensor or the like that the steering position is the neutral position, therefore, the user assists in confirming that the steering position is the neutral position, and permits the shift from the first control mode to the second control mode.

In a preferred embodiment of the present invention, the system further includes a steering position sensor to detect the steering position of the steering device. The controller is configured or programmed to determine that the steering position is the neutral position if the steering position sensor detects the neutral position.

With this arrangement, if the steering position is properly detected by the steering position sensor, the controller utilizes the detection signal of the steering position sensor to confirm that the steering position is the neutral position.

In a preferred embodiment of the present invention, the controller is configured or programmed to control the steering device to perform a neutral position returning operation to guide the steering position of the steering device to the neutral position when the shift from the first control mode to the second control mode is to be performed, and to determine that the steering position is the neutral position upon completion of the neutral position returning operation.

With this arrangement, the controller performs the neutral position returning operation to control the steering device to return to the neutral position thereof if the steering device is able to be properly actuated. If the neutral position returning operation is properly completed, it is possible to determine that the steering position is the neutral position. The shift from the first control mode to the second control mode is performed after the steering position is set to the neutral position.

In a preferred embodiment of the present invention, a helm controller connected to the course changing operator, a steering controller connected to the steering device, and an attitude controller connected to the port-side actuator and the starboard-side actuator are connected to each other in a communicable manner. Through communications between the helm controller and the steering controller, the steering device is controlled in the first control mode. Through communications between the helm controller and the attitude controller, the port-side actuator and the starboard-side actuator are controlled in the second control mode.

With this arrangement, if some trouble occurs in the communications between the helm controller and the steering controller, the error occurs in the operation performed by the actuation of the steering device in response to the operation of the course changing operator. In this case, if no trouble occurs in the communications between the helm controller and the attitude controller, the steering operation is able to be performed in the second control mode.

In a preferred embodiment of the present invention, the propulsion device is the sole propulsion device attached to the hull.

Where the propulsion device includes a plurality of propulsion devices attached to the hull, the course of the hull is able to be changed by changing the propulsive force distribution among the plural propulsion devices. This course changing operation cannot be utilized where the sole propulsion device is provided. That is, if the error occurs in the operation performed by the actuation of the steering device in response to the operation of the course changing operator, it is impossible to perform the course changing operation utilizing the propulsive force distribution among the plurality of propulsion devices. With the provision of the system to change the course of the watercraft by actuating the port-side and starboard-side attitude control plates in response to the operation of the course changing operator, therefore, the course of the watercraft is able to be changed by the operation of the course changing operator even if the error occurs.

Another preferred embodiment of the present invention provides a watercraft, which includes a hull, and a watercraft running system provided in the hull and including the above-described features.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is a flowchart to describe another exemplary process to be performed by the controller.

FIG. 5 is a flowchart to describe a specific example of an error monitoring process to be performed by the controller.

FIG. 6 is a flowchart to describe an exemplary neutral position confirming process to be performed by the controller.

DETAILED DESCRIPTION OF THE PREFERRED EMBODIMENTS

Figure 1:
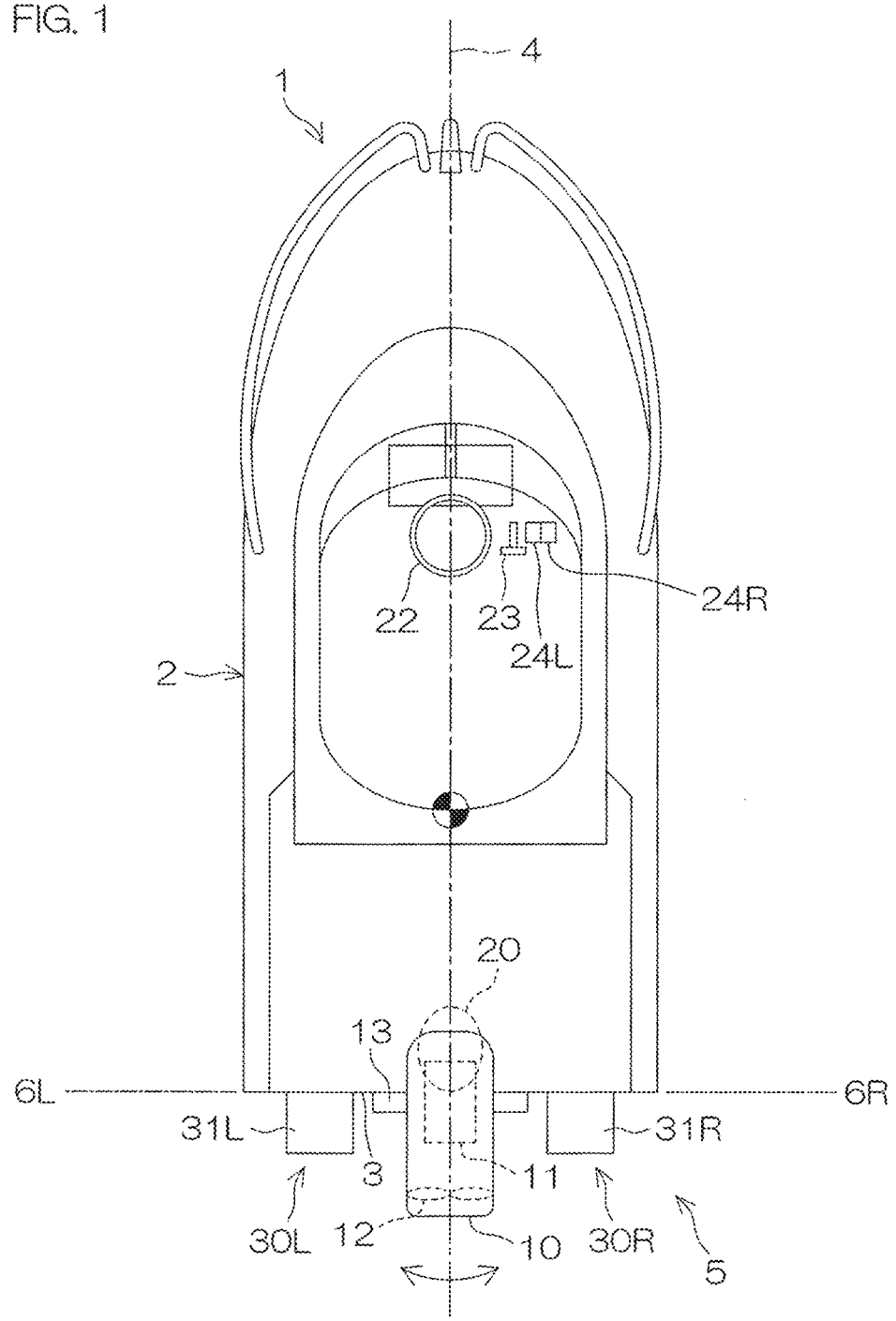
FIG. 1 is a schematic plan view to describe the structure of a watercraft according to a preferred embodiment of the present invention.

FIG. 1 is a schematic plan view to describe the structure of a watercraft 1 according to a preferred embodiment of the present invention. The watercraft 1 includes a hull 2, and a watercraft running system 5 provided in the hull 2. The watercraft running system 5 includes an outboard motor 10, a steering device 20, a steering wheel 22, and a port-side trim tab device 30L and a starboard-side trim tab device 30R. The watercraft running system 5 further includes an acceleration lever 23, and a pair of trim tab operators 24L, 24R.

The outboard motor 10 is an example of the propulsion device which applies a propulsive force to the hull 2. The outboard motor 10 is attached to the rear end, i.e., the stern 3, of the hull 2. In the present preferred embodiment, the outboard motor 10 is the sole propulsion device attached to the hull 2. The outboard motor 10 is attached to the middle of the stern 3, and is able to be pivoted leftward and rightward. The middle of the stern 3 refers to a position at which the stern 3 intersects the center line 4 of the hull 2. The center line 4 of the hull 2 is a line extending anteroposteriorly through a widthwise middle point of the hull 2 as seen in a plan view.

More specifically, the outboard motor 10 is attached to the stern 3 via an attachment unit 13. Though not shown in detail, the attachment unit 13 includes a clamp bracket fixed to the stern 3, a swivel bracket attached to the clamp bracket via a tilt shaft so as to be pivotal upward and downward, and the like. The outboard motor 10 is attached to the swivel bracket via a steering shaft so as to be pivotable leftward and rightward.

The outboard motor 10 includes a motor 11, and a propeller 12 driven by the motor 11. The motor 11 may be an engine (internal combustion engine), or may be an electric motor. In the following description, an engine outboard motor including an engine is provided as the motor 11 by way of example.

The steering device 20 is operable to change the course of the watercraft 1. More specifically, the steering device 20 changes the direction of the propulsive force applied to the hull 2 by the outboard motor 10. Still more specifically, the steering device 20 is configured to turn the outboard motor 10 by pivoting the outboard motor 10 about the axis of the steering shaft. In the present preferred embodiment, the steering device 20 includes a turning actuator 21 (see FIG. 3) such as an electric motor or a hydraulic cylinder, and is configured to pivot the outboard motor 10 about the steering shaft by a power generated by the turning actuator 21.

The steering wheel 22 is an example of the course changing operator which is operated by the user to change the course of the watercraft 1. The turning actuator 21 of the steering device 20 is controlled according to the operation signal of the steering wheel 22. Thus, the steering device 20 is actuated according to the operation of the steering wheel 22. Therefore, the user operates the steering wheel 22 to turn the outboard motor 10 to change the course of the watercraft 1.

The acceleration lever 23 is an output operator which is operated by the user to adjust the propulsive force to be generated by the outboard motor 10. The output of the outboard motor 10, more specifically, the rotation speed of the engine, is controlled according to the operation signal of the acceleration lever 23. The acceleration lever 23 may also function as a shift operator to switch the direction of the propulsive force generated by the outboard motor 10 between a forward drive direction and a reverse drive direction. Specifically, the shift position of the outboard motor 10 is controlled to be set to one of a forward drive position, a neutral position, and a reverse drive position according to the operation signal of the acceleration lever 23.

The port-side trim tab device 30L includes a port-side trim tab 31L attached to the port side of the hull 2 (in the present preferred embodiment, the port side of the stern 3) and is movable upward and downward with respect to the hull 2 to control the attitude of the hull 2. The port-side trim tab device 30L further includes a port-side actuator 32L (see FIG. 3) to move up and down the port-side trim tab 31L with respect to the hull 2. Similarly, the starboard-side trim tab device 30R includes a starboard-side trim tab 31R attached to the starboard side of the hull 2 (in the present preferred embodiment, the starboard side of the stern 3) and is movable upward and downward with respect to the hull 2 to control the attitude of the hull 2. The starboard-side trim tab device 30R further includes a starboard-side actuator 32R (see FIG. 3) to move up and down the starboard-side trim tab 31R with respect to the hull 2. The port-side trim tab 31L is an example of the port-side attitude control plate, and the starboard-side trim tab 31R is an example of the starboard-side attitude control plate. The port-side trim tab 31L and the starboard-side trim tab 31R are configured to be pivotable upward and downward about pivot axes 6L, 6R each extending laterally.

The trim tab operators 24L, 24R are disposed in the vicinity of the steering wheel 22, for example. The trim tab operators 24L, 24R are operators provided in association with the port-side trim tab device 30L and the starboard-side trim tab device 30R, respectively, to control the trim by a manual operation performed by the user.

Figure 2:
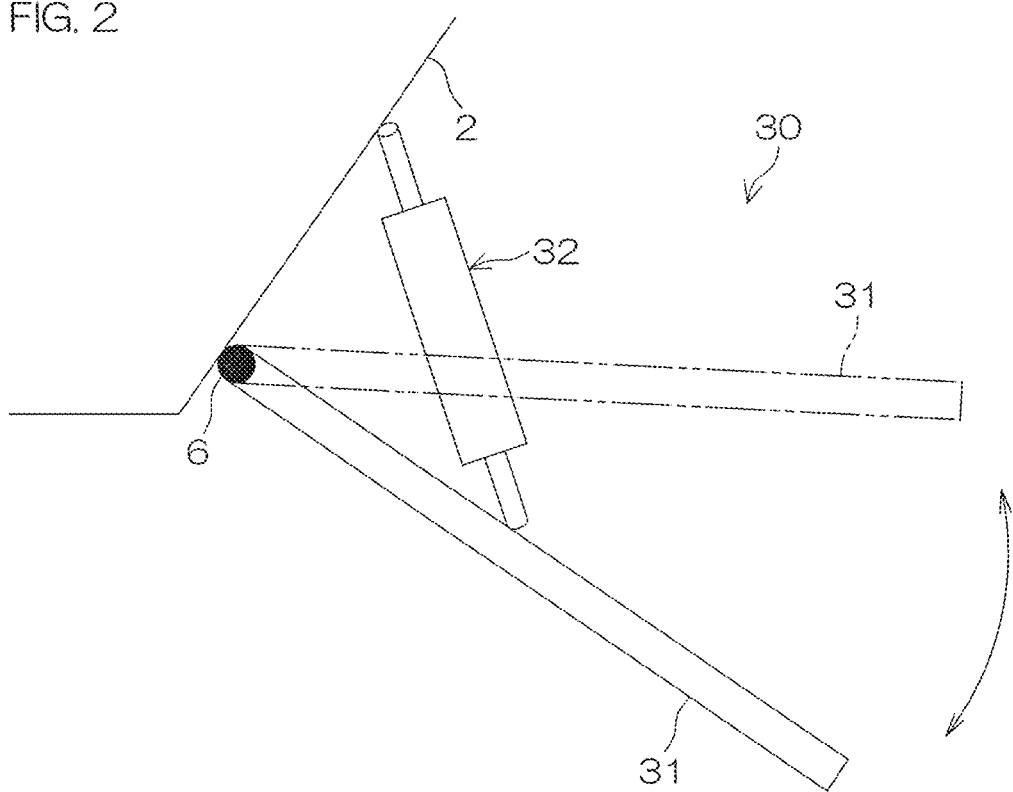
FIG. 2 is a schematic side view to describe the structure of a trim tab device by way of example.

FIG. 2 is a schematic side view to describe the structure of the trim tab device 30 by way of example. The port-side trim tab device 30L and the starboard-side trim tab device 30R have the same structure and, therefore, will be collectively referred to as "trim tab device 30" in the description with reference to FIG. 2. In FIG. 2, the components will be respectively denoted by the numeric parts of the reference characters with the suffixes "L" and "R" omitted from the reference characters. The trim tab device 30 includes the trim tab 31, and the actuator 32 (trim tab actuator) which drives the trim tab 31. The trim tab 31 is attached to the rear end, i.e., the stern 3, of the hull 2. More specifically, the trim tab 31 is attached to the stern 3 to pivot about the pivot axis 6 at the stern 3. The trim tab 31 is a plate having a proximal edge attached to the stern 3. The trim tab 31 is pivotable about its proximal edge such that its free edge is moved up and down. Thus, the trim tab 31 is shifted up and down with respect to the hull 2, functioning as the attitude control plate to control the attitude of the hull 2. The pivot axis 6 may be parallel or substantially parallel to the transverse direction of the hull 2, or may be inclined with respect to the transverse direction of the hull 2. The pivot axis 6 may extend in a horizontal direction, or may be inclined with respect to the horizontal direction.

The actuator 32 is disposed between the trim tab 31 and the hull 2 so as to connect the trim tab 31 to the hull 2. The actuator 32 drives the trim tab 31 to pivot the trim tab 31 with respect to the hull 2. Thus, the trim tab 31 is able to be pivoted between a lower position indicated by a solid line in FIG. 2 and an upper position indicated by a two-dot-and-dash line in FIG. 2. With the trim tab 31 located in the lower position, the free edge of the trim tab 31 may be located at a lower level than the bottom of the hull 2. With the trim tab 31 located in the upper position, the free edge of the trim tab 31 may be located at a higher level than the bottom of the hull 2.

Figure 3:
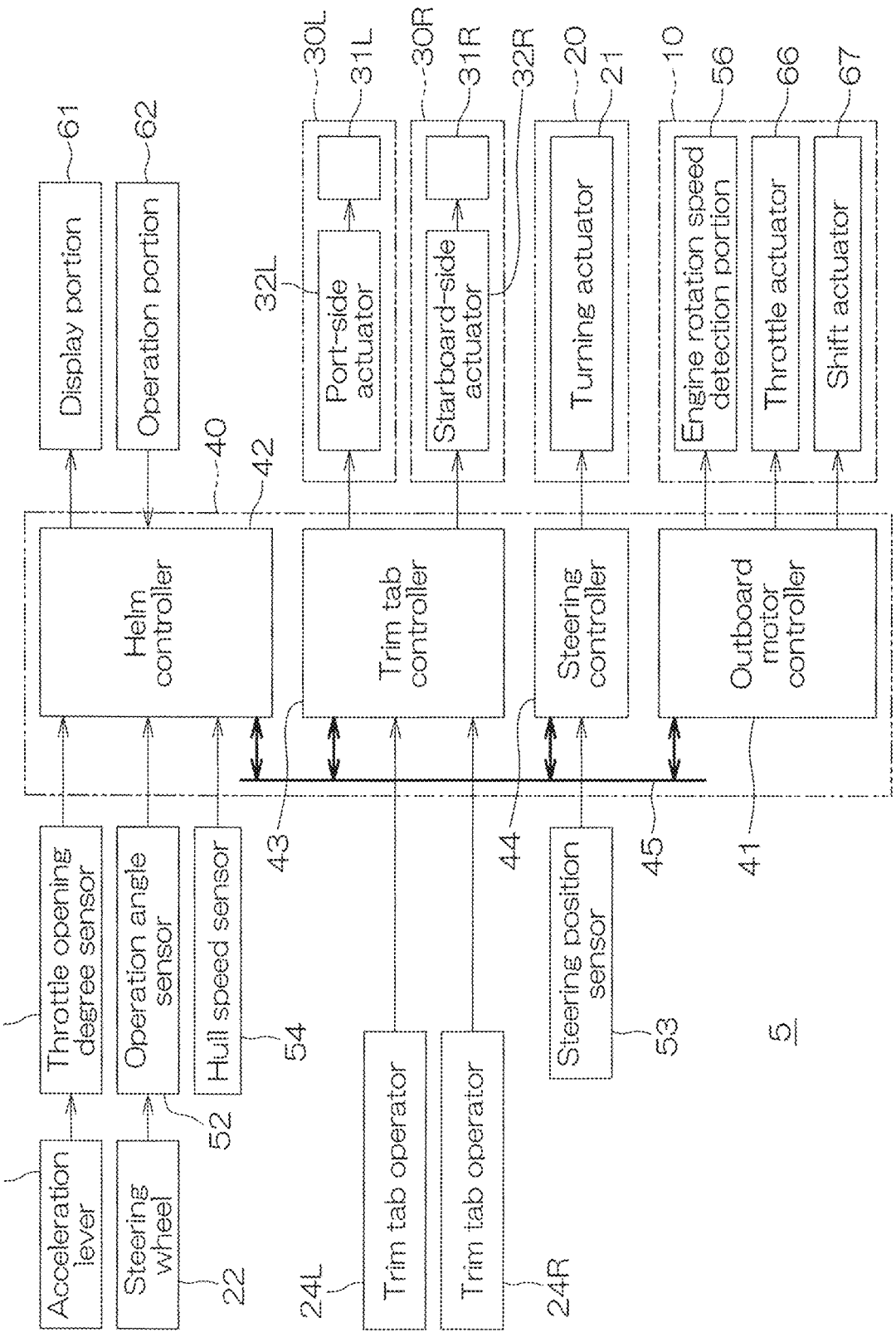
FIG. 3 is a block diagram to describe the electrical configuration of a watercraft running system by way of example.

FIG. 3 is a block diagram to describe the electrical configuration of the watercraft running system 5 by way of example. The watercraft running system 5 includes a controller 40. The watercraft running system 5 further includes a throttle opening degree sensor 51, an operation angle sensor 52, a hull speed sensor 54, a display portion 61, and an operation portion 62, which are connected to the controller 40. The watercraft running system 5 further includes a steering position sensor 53, an engine rotation speed detection portion 56, the turning actuator 21, the port-side actuator 32L, and the starboard-side actuator 32R, which are connected to the controller 40. The watercraft running system 5 further includes a throttle actuator 66, a shift actuator 67, and the like.

The throttle opening degree sensor 51 is an operation position sensor which detects the operation position of the acceleration lever 23 (acceleration operator) and outputs a detection signal indicating the detected operation position. The throttle actuator 66 and the shift actuator 67 are provided in the outboard motor 10. The throttle actuator 66 drives the throttle valve of the engine provided in the outboard motor 10 and changes the opening degree of the throttle valve. The shift actuator 67 actuates a shift mechanism provided in the outboard motor 10 to change the shift position of the outboard motor 10 among the forward drive position, the neutral position, and the reverse drive position. The operation of the acceleration lever 23 may be mechanically transmitted to the outboard motor 10, for example, by a wire or the like. In this case, the throttle actuator 66 may be obviated. The throttle opening degree sensor 51 may detect the position (opening degree) of the throttle valve of the engine.

The operation angle sensor 52 detects the operation angle (operation position) of the steering wheel 22, and outputs a detection signal indicating the detected operation angle. The hull speed sensor 54 detects the speed of the hull 2, and outputs a detection signal indicating the detected speed. The steering position sensor 53 detects the steering position of the steering device 20. More specifically, the steering position sensor 53 may be a turning angle sensor which detects the turning angle of the outboard motor 10 changed by the steering device 20. The engine rotation speed detection portion 56 detects the rotation speed of the engine provided in the outboard motor 10.

The display portion 61 is a device (so-called gage) which displays information to be provided to the user that maneuvers the watercraft, and includes a two-dimensional display panel such as a liquid crystal display panel. The operation portion 62 is an input operation device which is operated by the user, and may be, for example, a touch panel disposed on the display screen of the display portion 61, or may be a physical switch (operation button) provided in the vicinity of the display screen.

In the present preferred embodiment, the controller 40 includes an outboard motor controller 41, a helm controller 42, a trim tab controller 43 and a steering controller 44, which are connected to each other via a communication line 45 in a communicable manner.

The detection signal (steering angle signal) of the operation angle sensor 52 and the detection signal (lever operation position signal) of the throttle opening degree sensor 51 are inputted to the helm controller 42. The helm controller 42 generates a steering command and an output command according to these input signals, and outputs the steering command and the output command to the communication line 45. The steering command outputted to the communication line 45 is received by the steering controller 44 or the trim tab controller 43. The output command outputted to the communication line 45 is received by the outboard motor controller 41. The detection signal of the hull speed sensor 54 may be further inputted to the helm controller 42.

The outboard motor controller 41 is a propulsion device controller provided in the outboard motor 10 as an example of the propulsion device. The throttle actuator 66 and the shift actuator 67 are connected to the outboard motor controller 41. The outboard motor controller 41 controls the throttle actuator 66 and the shift actuator 67 according to the output command outputted to the communication line 45.

Thus, the outboard motor 10 generates a propulsive force having a magnitude and a direction (the forward drive direction or the reverse drive direction) according to the output command.

The steering controller 44 controls the turning actuator 21 according to the steering command outputted to the communication line 45. The detection signal of the steering position sensor 53 is inputted to the steering controller 44.

The trim tab controller 43 is an example of the attitude controller. The trim tab operators 24L, 24R are connected to the trim tab controller 43. The trim tab controller 43 controls the port-side actuator 32L and the starboard-side actuator 32R according to the operation of the trim tab operators 24L, 24R to actuate the port-side and starboard-side trim tabs 31L, 31R. The trim tab controller 43 includes a control mode in which the port-side actuator 32L and the starboard-side actuator 32R are controlled in response to the steering command outputted to the communication line 45. Specifically, the trim tab controller 43 includes an ordinary mode (first control mode) and a steering mode (second control mode). In the ordinary mode, the trim tab controller 43 responds to the operation of the trim tab operators 24L, 24R, but does not respond to the steering command outputted to the communication line 45. In the steering mode, on the other hand, the trim tab controller 43 controls the port-side actuator 32L and the starboard-side actuator 32R according to the steering command outputted to the communication line 45 to perform a steering operation by the actuation of the port-side and starboard-side trim tabs 31L, 31R. When predetermined mode shift conditions are satisfied in the ordinary mode, the trim tab controller 43 shifts the control mode into the steering mode (second control mode). The steering mode is thereafter maintained until the power supply to the system is turned off.

The control mode of the trim tab controller 43 is associated with the overall operation of the watercraft running system 5 and, therefore, is suitably handled as the control mode of the entire controller 40.

In the ordinary mode, the trim tab controller 43 responds to an operation command from the trim tab operators 24L, 24R. The trim tab controller 43 may communicate with the outboard motor controller 41, and may automatically control the positions of the port-side and starboard-side trim tabs 31L, 31R according to the trim angle and the turning angle of the outboard motor 10. The ordinary mode may include an attitude control mode in which the attitude of the hull 2 is controlled by the automatic control of the positions of the trim tabs 31L, 31R. The ordinary mode may include a steering assist mode in which the steering of the hull 2 is assisted by the automatic control of the positions of the trim tabs 31L, 31R.

The trim tab controller 43 may respond to the operation command of the trim tab operators 24L, 24R or not to respond to the operation command of the trim tab operators 24L, 24R in the steering mode. In the steering mode, the trim tab controller 43 may additionally perform the automatic control, or may interrupt the automatic control.

The outboard motor controller 41, the helm controller 42, the trim tab controller 43 and the steering controller 44 each have a microcomputer-based configuration. Specifically, these controllers each include a processor (CPU) and a memory. The memory stores a program and data. The processor executes the program stored in the memory to perform various control and computation operations, thus functioning as a plurality of functional operation sections.

The configuration of the controller 40 is not limited to that shown in FIG. 3. For example, the controller 40 may physically include a single controller. Further, the controller 40 may physically include two or more controllers to provide the functions.

Figure 4:
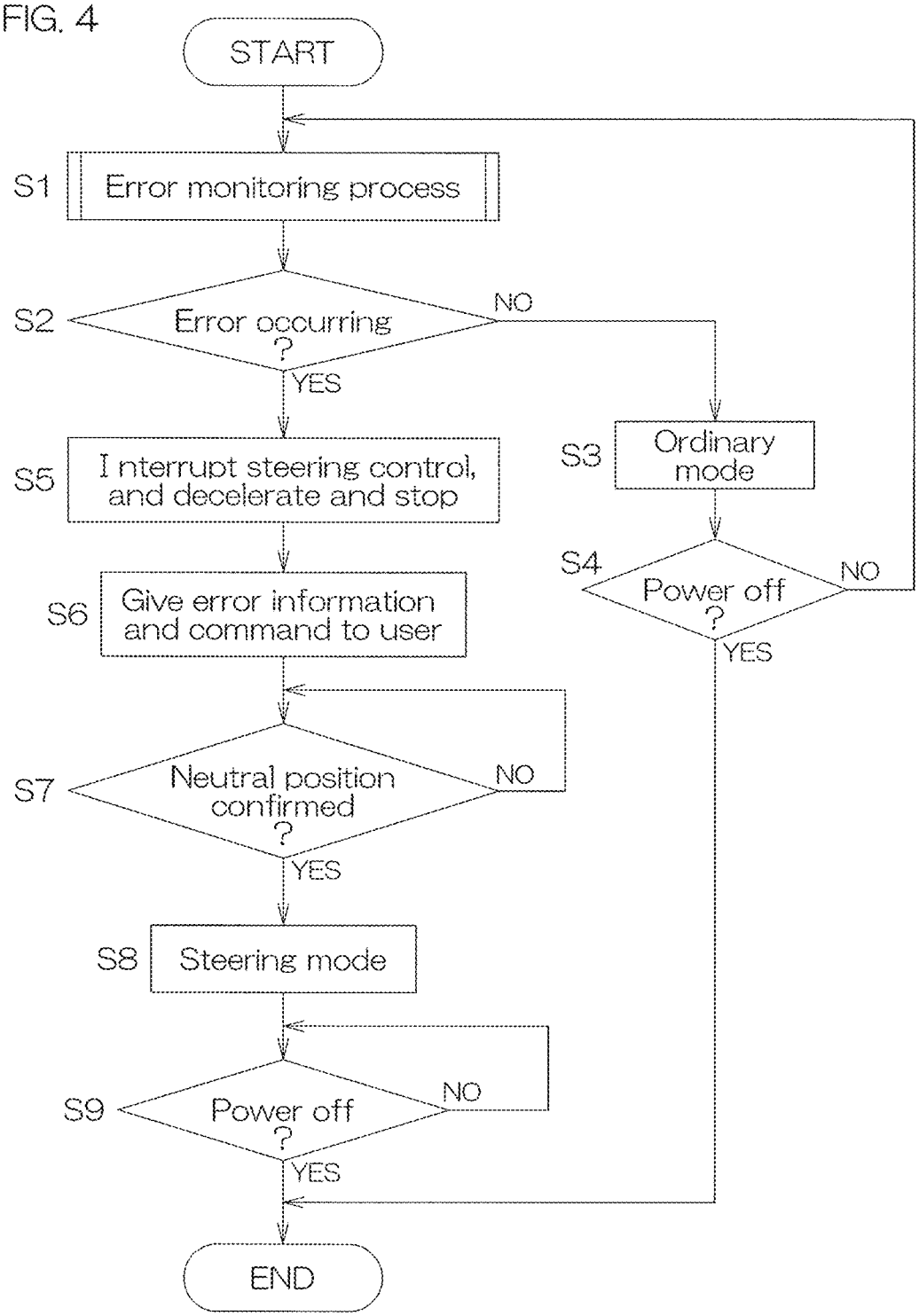
FIG. 4 is a flowchart to describe an exemplary process to be performed by a controller.

FIG. 4 is a flowchart to describe an exemplary process to be performed by the controller 40, mainly showing a process to be performed by the trim tab controller 43.

When the process is started after the power supply to the system is turned on, the controller 40 performs an error monitoring process to detect an error in the steering system (Step S1). The error in the steering system herein refers to a phenomenon in which some trouble occurs in an operation sequence performed by actuating the turning actuator 21 according to the operation of the steering wheel 22. If the error does not occur in the steering system (NO in Step S2), the trim tab controller 43 performs a control operation in the ordinary mode (Step S3). In the ordinary mode, the error monitoring process is repeatedly performed to constantly monitor the state of the steering system until the power supply to the system is turned off (YES in Step S4).

If the error occurs in the steering system (YES in Step S2), the controller 40 interrupts a steering operation performed according to the operation of the steering wheel 22, and performs a control operation to decelerate and stop the watercraft 1 (Step S5). Specifically, the outboard motor controller 41 controls the throttle actuator 66 to automatically decelerate and stop the watercraft 1 by reducing the output of the engine (specifically, the rotation speed of the engine) for the deceleration of the watercraft 1.

On the other hand, the controller 40 informs the user that the error occurs in the steering system (Step S6). Further, the controller 40 may inform the user that the watercraft 1 is decelerated to be automatically stopped. Further, the controller 40 provides the user with a command to manually set the steering position to the neutral position after the watercraft 1 is stopped (Step S6). Some or all of the information may be provided by displaying a message on the display portion 61. The information may be audible information, or may be provided by lighting an indicator lamp. The display portion 61 is an example of the notifier.

After the watercraft 1 is sufficiently decelerated to be stopped or substantially stopped, the user manually adjusts the steering position of the steering device 20 to the neutral position (specifically, the turning angle of the outboard motor 10). For the manual adjustment of the steering position, the user typically pivots the outboard motor 10 about the steering shaft by applying an external force to the outboard motor 10. The steering device 20 may further include a mechanism for the manual adjustment of the steering position. In this case, the manual adjustment mechanism may be used.

After it is confirmed that the steering position is the neutral position (Step S7), the trim tab controller 43 shifts the control mode from the ordinary mode to the steering mode (Step S8) such that the trim tab controller 43 actuates the port-side actuator 32L and the starboard-side actuator 32R according to the steering command applied from the helm controller 42. Thus, the port-side trim tab 31L and the starboard-side trim tab 31R are actuated according to the operation of the steering wheel 22 to apply a turning force to the hull 2 by a difference in running resistance between the port side and the starboard side such that the course of the watercraft 1 is changed.

After the shift to the steering mode, the control mode of the trim tab controller 43 is maintained in the steering mode until the power supply to the system is turned off (Step S9).

If the power supply to the system is turned on again, the error monitoring process is performed (Step S1). Therefore, if the error in the steering system is eliminated, the trim tab controller 43 performs the control operation in the ordinary mode (Step S3). If the error is not eliminated or another error occurs in the steering system, the control operation is performed in the steering mode (Step S8).

FIG. 4A is a flowchart to describe another exemplary process. In FIG. 4A, process steps substantially the same as those shown in FIG. 4 will be denoted by the same reference characters, and duplicate description will be omitted.

In this exemplary process, if the error is detected in the steering system, the steering control operation is interrupted, and the user performs a watercraft maneuvering operation to decelerate and stop the watercraft 1 (Step S5A). Therefore, the user is provided with a command to perform the watercraft maneuvering operation to decelerate and stop the watercraft 1. In response to the command, the user operates the acceleration lever 23 to decelerate and stop the watercraft 1. After the watercraft 1 is decelerated to be stopped or substantially stopped, the user manually adjusts the steering position of the outboard motor 10 to the neutral position.

FIG. 5 is a flowchart to describe a specific example of the error monitoring process (Step S1 in FIG. 4) to be performed by the controller 40. In the error monitoring process, whether or not the error occurs in the steering system, i.e., whether or not the error is caused by inconsistency between the operation of the steering wheel 22 and the operation of the steering device 20, is monitored. Specific examples of the error to be monitored are as follows. In the error monitoring process, one of these exemplary errors is monitored, or two or more of these exemplary errors are monitored in combination.

(1) An error in the steering position sensor 53 (Step S11)
(2) An error in the turning actuator 21 (temperature increase and other troubles) (Step S12)
(3) A communication error (Step S13)

The error associated with the steering position sensor 53 is able to be monitored mainly by the operation of the steering controller 44. The steering controller 44 is able to detect the error associated with the steering position sensor 53, for example, by monitoring whether or not a voltage inputted to a connection port of the steering position sensor 53 falls within a predetermined voltage range. Specific examples of the error to be detected include a trouble in the steering position sensor 53, and signal line disconnection in the steering position sensor 53.

The error in the turning actuator 21 is able to be monitored mainly by the operation of the steering controller 44. For example, the steering controller 44 may detect the output signal of the steering position sensor 53 while driving the turning actuator 21, and determine that the error occurs in the turning actuator 21 if inconsistency between a drive command and the steering position detected by the steering position sensor 53 is detected. Where the turning actuator 21 includes a temperature sensor, the steering controller 44 may determine that the error occurs in the turning actuator 21 if a temperature detected by the temperature sensor falls outside a predetermined reference range.

The communication error is mainly an error associated with the communications between the helm controller 42 and the steering controller 44. The communication error is monitored mainly by the helm controller 42 and the steering controller 44.

If any of the errors occurs during the monitoring (YES in Step S14), at least the trim tab controller 43 is informed of the occurrence of the error (Step S15). Further, the outboard motor controller 41 is preferably informed of the occurrence of the error. If possible, all the controllers 41 to 44 communicable with each other are informed of the occurrence of the error. Upon reception of the information of the occurrence of the error in the steering system, the steering controller 44 interrupts the control operation of the steering device 20. Further, the outboard motor controller 41 performs the control operation to decelerate and stop the watercraft 1 (see Step S5 in FIG. 4). Then, the neutral position confirming process (Step S7) is performed, and the control mode of the trim tab controller 43 is shifted to the steering mode.

FIG. 6 is a flowchart to describe an example of the neutral position confirming process (Step S7 in FIG. 4). With reference to the detection signal of the hull speed sensor 54, the controller 40 determines whether or not the watercraft 1 is decelerated to be stopped or substantially stopped (Step S21).

If the watercraft 1 is stopped or substantially stopped (YES in Step S21), the controller 40 causes the steering controller 44 and the steering device 20 to perform a neutral position returning operation (Step S22). The neutral position returning operation is such that the steering device 20 is actuated to return the steering position of the outboard motor 10 to the neutral position. For example, the neutral position returning operation may be such that an original position returning operation is performed to guide the steering position to an original position and then the turning actuator 21 is actuated for a predetermined operation amount corresponding to a distance between the original position and the neutral position. If the neutral position returning operation is completed without any trouble (YES in Step S23), the controller 40 determines that the steering position is the neutral position (Step S26).

After the watercraft 1 is stopped or substantially stopped (YES in Step S21), the controller 40 may monitor whether or not the steering position sensor 53 detects the neutral position. If the steering position sensor 53 detects the neutral position (YES in Step S24), the controller 40 may determine that the steering position is the neutral position (Step S26).

For the confirmation of the completion of the neutral position returning operation (Step S23), the detection signal of the steering position sensor 53 may be used. When the user manually operates the outboard motor 10 into the neutral position, it is determined, based on the detection signal of the steering position sensor 53, that the steering position is the neutral position. In order to allow for the determination, however, the steering position sensor 53 is required to work normally to detect the steering position.

Figure 7:
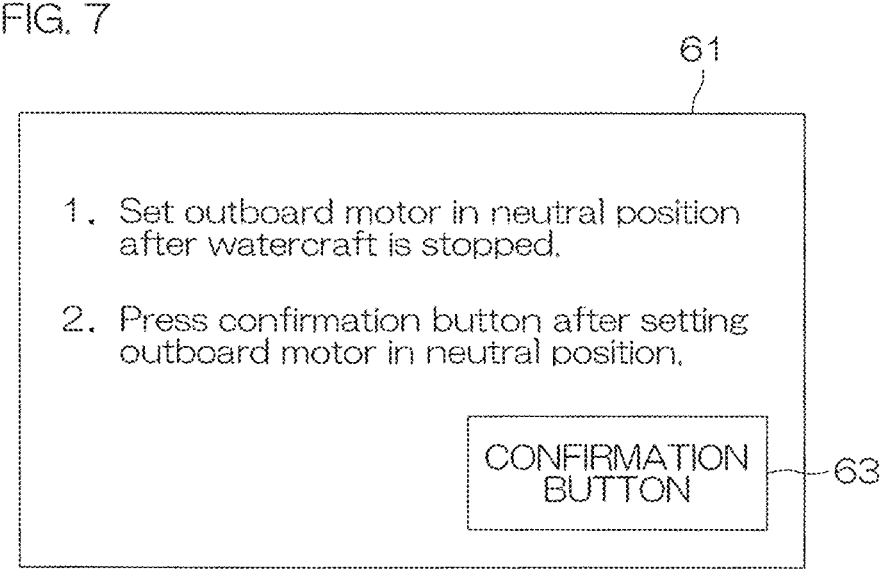
FIG. 7 shows an exemplary display image of a display portion in which a confirmation button is displayed.

If the watercraft 1 is stopped or substantially stopped (YES in Step S21), the controller 40 displays an operable confirmation button 63 on the display portion 61 as shown in FIG. 7 by way of example. The confirmation button 63 is an example of the confirmation operator to be operated by the user. The user operates the confirmation button 63 after confirming that the steering position of the outboard motor 10 is the neutral position. A message "Press confirmation button after setting outboard motor in neutral position" or the like is preferably displayed on the display portion 61. If the confirmation button 63 is operated (YES in Step S25), the controller 40 determines that the steering position is the neutral position (Step S26). If some trouble occurs in the turning actuator 21, there is a possibility that the neutral position returning operation described above cannot be normally completed. In this case, the user manually operates the outboard motor 10 to set the steering position to the neutral position, and then operates the confirmation button 63. Thus, the controller 40 is able to determine that the steering position is the neutral position.

If the neutral position returning operation is not normally completed (NO in Step S23), if the steering position sensor 53 does not detect the neutral position (NO in Step S24), or if the user does not operate the confirmation button 63 (NO in Step S25), the controller 40 determines that the steering position is not the neutral position (Step S27). If the user does not operate the confirmation button 63 during a standby period predetermined in consideration of the time required for the user to manually set the steering position to the neutral position, for example, the controller 40 may determine that the confirmation button 63 is not operated.

According to the present preferred embodiment, as described above, the trim tab controller 43 does not respond to the steering command outputted by the helm controller 42 when the control mode of the trim tab controller 43 is the ordinary mode (first control mode). At this time, the steering controller 44 actuates the steering device 20 in response to the steering command. Therefore, the steering device 20 is actuated according to the operation of the steering wheel 22 such that the steering operation is performed by turning the outboard motor 10. When the control mode of the trim tab controller 43 is the steering mode (second control mode), the steering controller 44 does not respond to the steering command outputted by the helm controller 42. At this time, the trim tab controller 43 actuates the port-side trim tab device 30L and the starboard-side trim tab device 30R in response to the steering command. Therefore, the port-side trim tab 31L and the starboard-side trim tab 31R are actuated according to the operation of the steering wheel 22 such that the running resistance distribution between the port side and the starboard side is changed. Thus, the turning force is applied to the hull 2 according to the operation of the steering wheel 22 so that the steering operation is performed according to the operation of the steering wheel 22.

The shift of the control mode of the trim tab controller 43 from the ordinary mode to the steering mode is permitted on condition that the steering position of the steering device 20 is the neutral position. Therefore, the control operation in the steering mode is able to be started with the steering position of the steering device 20 set to the neutral position. In the steering mode, therefore, the steering device 20 is substantially irrelevant to the course change. Thus, the steering operation is able to be properly and efficiently performed by the actuation of the port-side trim tab 31L and the starboard-side trim tab 31R, thus providing excellent steerability.

In a preferred embodiment of the present invention, when the trim tab controller 43 is in the ordinary mode, the controller 40 performs the error monitoring process to monitor whether or not the error occurs in the steering operation (sequence) performed by the actuation of the steering device 20 in response to the operation of the steering wheel 22. If the error is detected, the neutral position confirming process is performed to confirm that the steering position of the steering device 20 is the neutral position. If it is confirmed that the steering position of the steering device 20 is the neutral position, the control mode of the trim tab controller 43 is automatically switched from the ordinary mode to the steering mode. Therefore, the control mode is properly and automatically shifted from the ordinary mode to the steering mode as required and, therefore, the steering operation is smoothly shifted to the steering operation utilizing the port-side trim tab device 30L and the starboard-side trim tab device 30R.

In the exemplary process shown in FIG. 4, if the error is detected by the error monitoring process, the controller 40 automatically reduces the output of the outboard motor 10 to decelerate the watercraft 1 and stop or substantially stop the watercraft 1. Therefore, the control mode of the trim tab controller 43 is able to be shifted to the steering mode with the steering position of the steering device 20 set to the neutral position after the watercraft 1 is stopped or substantially stopped.

In the exemplary process shown in FIG. 4A, when the error is detected by the error monitoring process, the command to decelerate and stop the watercraft 1 is displayed on the display portion 61. The user follows the command such that the watercraft 1 is decelerated to be stopped or substantially stopped. Therefore, the control mode of the trim tab controller 43 is shifted to the steering mode with the steering position of the steering device 20 set to the neutral position after the watercraft 1 is stopped or substantially stopped.

In a preferred embodiment of the present invention, if the steering device 20 is able to be properly actuated when the error is detected, the controller 40 performs the neutral position returning operation to return the steering device 20 to the neutral position. If this operation is normally completed, the trim tab controller 43 determines that the steering position is the neutral position, and shifts the control mode from the ordinary mode to the steering mode.

In a preferred embodiment of the present invention, if the steering position sensor 53 can properly detect the steering position when the error is detected, the control mode is shifted from the ordinary mode to the steering mode, after it is confirmed, based on the detection signal of the steering position sensor 53, that the steering position is the neutral position.

In a preferred embodiment of the present invention, when the error is detected, the controller 40 displays the confirmation button 63 on the display portion 61. Then, if the user operates the confirmation button 63, the trim tab controller 43 determines that the steering position of the steering device 20 is the neutral position, and shifts the control mode from the ordinary mode to the steering mode. Therefore, even if the steering device 20 does not properly work or even if the steering position sensor 53 fails to detect the steering position, the control mode is able to be shifted from the ordinary mode to the steering mode. Therefore, the steering operation is able to be performed by utilizing the port-side trim tab device 30L and the starboard-side trim tab device 30R.

In a preferred embodiment of the present invention, the controller 40 includes the helm controller 42, the steering controller 44, and the trim tab controller 43 which are connected to each other by the communication line 45. A communication failure between the helm controller 42 and the steering controller 44 is an example of the error to be monitored by the error monitoring process. If the communication failure occurs, it is impossible to actuate the steering device 20 in response to the operation of the steering wheel 22. Therefore, the control mode of the trim tab controller 43 is shifted from the ordinary mode to the steering mode on condition that the steering position of the steering device 20 is the neutral position. If there is no communication failure between the helm controller 42 and the trim tab controller 43, the port-side trim tab device 30L and the starboard-side trim tab device 30R is able to be actuated in response to the operation of the steering wheel 22 such that the watercraft 1 is able to be steered.

In a preferred embodiment of the present invention, the outboard motor 10 is the sole propulsion device provided on the hull 2. Where the watercraft 1 includes a plurality of propulsion devices (e.g., a plurality of outboard motors 10) provided on the hull 2, a turning force is able to be applied to the hull 2 by adjusting the distribution of propulsive forces generated by the respective propulsion devices such that the course of the watercraft 1 is able to be changed. However, the watercraft 1 including the sole propulsion device cannot perform such a watercraft maneuvering operation. Therefore, it is useful to incorporate an additional arrangement to change the course of the watercraft 1 even if some trouble occurs in the operation performed by the actuation of the steering device 20 in response to the operation of the steering wheel 22. In a preferred embodiment of the present invention, the system is configured so that the port-side trim tab device 30L and the starboard-side trim tab device 30R are actuated in response to the operation of the steering wheel 22 when the error occurs in the ordinary steering operation. Thus, even the watercraft 1 including the sole propulsion device is able to have dual arrangements for the steering operation. Even if the error occurs, the steering operation is able to be performed by operating the steering wheel 22 so that the watercraft 1 is able to be steered in the same manner as in the ordinary steering operation. Thus, the user does not need to have a special watercraft maneuvering skill.

While preferred embodiments of the present invention have thus been described, the present invention may be embodied in some other ways as will be described below.

In a preferred embodiment described above, the trim tabs are used as the attitude control plates by way of example, but interceptors may be used as the attitude control plates. The interceptors are attitude control plates typically provided at the stern in a vertically movable manner, and each adapted to be moved up and down between a position in which they project downward from a lower surface (bottom) of the hull 2 and an accommodation position above the bottom of the hull 2. A controller which controls the interceptors is an example of the attitude controller.

In a preferred embodiment described above, the confirmation button 63 is displayed as the confirmation operator on the display portion 61 by way of example, but an operator such as a switch may be provided as the confirmation operator separately from the display portion 61.

In a preferred embodiment described above, the control mode is automatically shifted from the ordinary mode (first control mode) to the steering mode (second control mode) by way of example, but the user may perform a predetermined mode shift operation for the mode shift. In this case, the mode shift from the ordinary mode to the steering mode is preferably permitted on condition that the steering position of the steering device 20 is the neutral position.

In a preferred embodiment described above, the sole propulsion device (specifically, the outboard motor 10) is provided by way of example, but a plurality of propulsion devices may be provided. The propulsion device is not limited to the outboard motor, but may be a water jet propulsion device, an inboard motor, an inboard/outboard motor, or any other form of propulsion device.

In a preferred embodiment described above, the steering wheel 22 is used as the course changing operator by way of example, but may be a joystick or any other form of course changing operator.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A watercraft running system comprising:
   a propulsion device to apply a propulsive force to a hull of a watercraft;
   a steering device to change a course of the watercraft;
   a course changing operator operable by a user to change the course of the watercraft;
   a port-side attitude control plate and a starboard-side attitude control plate provided on a port side and a starboard side, respectively, of the hull to control an attitude of the hull and to move up and down on the port side and the starboard side, respectively, of the hull;
   a port-side actuator and a starboard-side actuator to actuate the port-side attitude control plate and the starboard-side attitude control plate, respectively; and
   a controller configured or programmed to include a first control mode in which the steering device is controlled according to the operation of the course changing operator, and a second control mode in which the port-side actuator and the starboard-side actuator are controlled according to the operation of the course changing operator; wherein
   the controller is configured or programmed to determine whether or not a steering position of the steering device is a neutral position, to prohibit shifting from the first control mode to the second control mode if the steering position is not the neutral position, and to permit the shift from the first control mode to the second control mode if the steering position is the neutral position.

2. The watercraft running system according to claim 1, wherein the controller is configured or programmed to perform an error monitoring operation to monitor whether or not an error occurs in a steering operation performed by actuating the steering device in response to the operation of the course changing operator in the first control mode, and, if the error is detected, to effect the shift to the second control mode on condition that the steering position is the neutral position.

3. The watercraft running system according to claim 2, further comprising:
   a notifier to provide information to the user; wherein
   the controller is configured or programmed to control the notifier to provide the user with a command to set the steering position of the steering device to the neutral position if the error is detected.

4. The watercraft running system according to claim 3, wherein the controller is configured or programmed to control the notifier to provide the user with a command to decelerate or stop the watercraft if the error is detected.

5. The watercraft running system according to claim 2, wherein the controller is configured or programmed to control the propulsion device to decelerate or stop the watercraft if the error is detected.

6. The watercraft running system according to claim 1, further comprising:
   a confirmation operator operable by the user after the user sets the steering position of the steering device to the neutral position; wherein
   the controller is configured or programmed to determine that the steering position is the neutral position if the operation of the confirmation operator is detected.

7. The watercraft running system according to claim 1, further comprising:
   a steering position sensor to detect the steering position of the steering device; wherein the controller is configured or programmed to determine that the steering position is the neutral position if the steering position sensor detects the neutral position.

8. The watercraft running system according to claim 1, wherein the controller is configured or programmed to control the steering device to perform a neutral position returning operation to guide the steering position of the steering device to the neutral position when the shift from the first control mode to the second control mode is to be performed, and to determine that the steering position is the neutral position, upon completion of the neutral position returning operation.

9. The watercraft running system according to claim 1, wherein
- a helm controller connected to the course changing operator, a steering controller connected to the steering device, and an attitude controller connected to the port-side actuator and the starboard-side actuator are connected to each other in a communicable manner;
- the steering device is controlled in the first control mode through communications between the helm controller and the steering controller; and
- the port-side actuator and the starboard-side actuator are controlled in the second control mode through communications between the helm controller and the attitude controller.

10. The watercraft running system according to claim 1, wherein
- the controller is configured or programmed to define and function as a helm controller connected to the course changing operator, a steering controller connected to the steering device, and an attitude controller connected to the port-side actuator and the starboard-side actuator, which are all connected to each other in a communicable manner
- the steering device is controlled in the first control mode through communications between the helm controller and the steering controller; and
- the port-side actuator and the starboard-side actuator are controlled in the second control mode through communications between the helm controller and the attitude controller.

11. The watercraft running system according to claim 1, wherein the propulsion device is a sole propulsion device attached to the hull.

12. A watercraft comprising:
- the watercraft running system according to claim 1; and
- the hull; wherein
- the watercraft running system is provided in the hull.

* * * * *